(12) United States Patent
Robertson, Jr. et al.

(10) Patent No.: US 11,571,773 B1
(45) Date of Patent: Feb. 7, 2023

(54) VEHICLE SENSOR ASSEMBLY

(71) Applicant: Ford Global Technologies, LLC, Dearborn, MI (US)

(72) Inventors: Michael Robertson, Jr., Garden City, MI (US); Tyler D. Hamilton, Farmington, MI (US); Venkatesh Krishnan, Canton, MI (US); Paulo Henrique Ungaretti, Camaçari/Bahia (BR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/675,117

(22) Filed: Feb. 18, 2022

(51) Int. Cl.
*B62D 65/02* (2006.01)
*B23P 19/10* (2006.01)

(52) U.S. Cl.
CPC ............ *B23P 19/10* (2013.01); *B62D 65/026* (2013.01)

(58) Field of Classification Search
CPC ............................... B23P 19/10; B62D 65/026
See application file for complete search history.

(56) References Cited

U.S. PATENT DOCUMENTS

| | | | |
|---|---|---|---|
| 6,729,429 B2 * | 5/2004 | Takahashi | B62D 25/084 180/311 |
| 7,346,994 B2 | 3/2008 | Shevela | |
| 9,580,023 B2 | 2/2017 | Bruss et al. | |
| 11,131,740 B2 * | 9/2021 | Houk | G01S 13/931 |
| 2008/0290672 A1 * | 11/2008 | Faass | G01D 11/30 293/117 |
| 2020/0346589 A1 | 11/2020 | Grünwald et al. | |

* cited by examiner

*Primary Examiner* — Nirvana Deonauth
(74) *Attorney, Agent, or Firm* — Frank A. MacKenzie; Bejin Bieneman PLC

(57) ABSTRACT

A method for installing sensors to a vehicle includes fixing a plurality of tolerance compensators to the vehicle. The method includes fixing a plurality of sensor brackets to a jig. The method includes fixing the jig to a vehicle. The method includes, after fixing the sensor brackets to the jig and the jig to the vehicle, fixing the sensor brackets to the vehicle by connecting the tolerance compensators to the sensor brackets and adjusting dimensions of the tolerance compensators to maintain positions of the sensor brackets relative to the vehicle and each other, the positions defined by the jig.

12 Claims, 6 Drawing Sheets

VEHICLE SENSOR ASSEMBLY

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
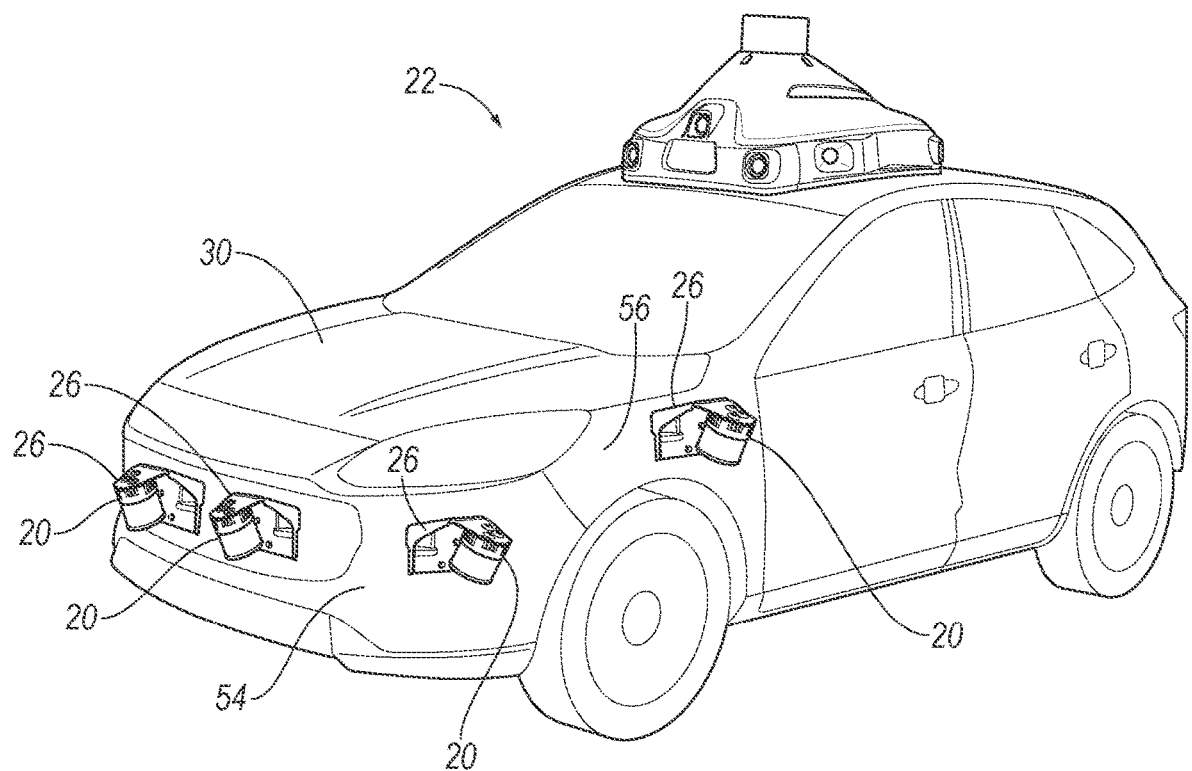
FIG. 1 is a perspective view a vehicle with sensors.
Figure 2:
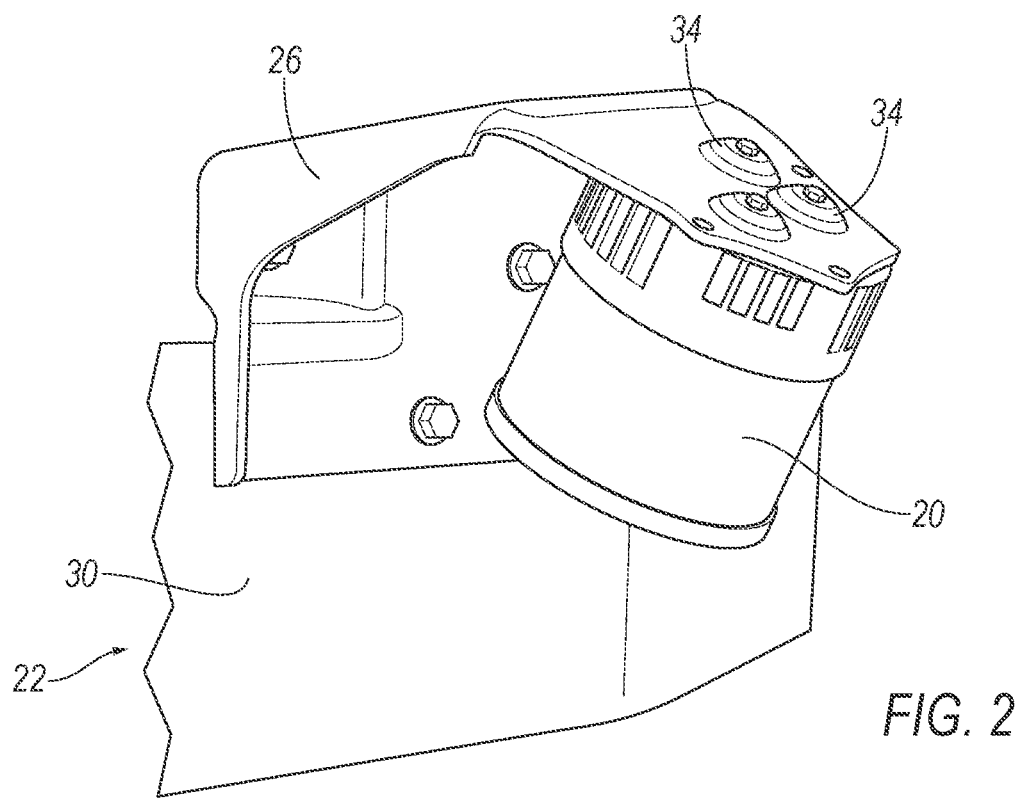
FIG. 2 is a perspective view of a portion of the vehicle with a sensor bracket supporting one of the sensors.
Figure 3:
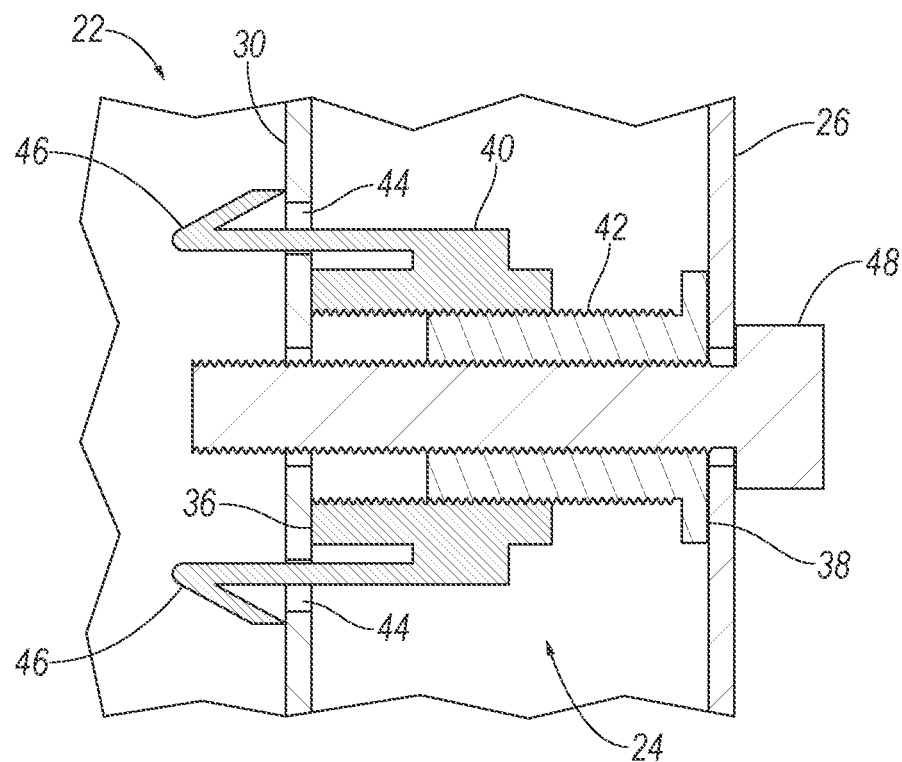
FIG. 3 is of a cross section of the portion of the vehicle with the sensor bracket.
Figure 4:
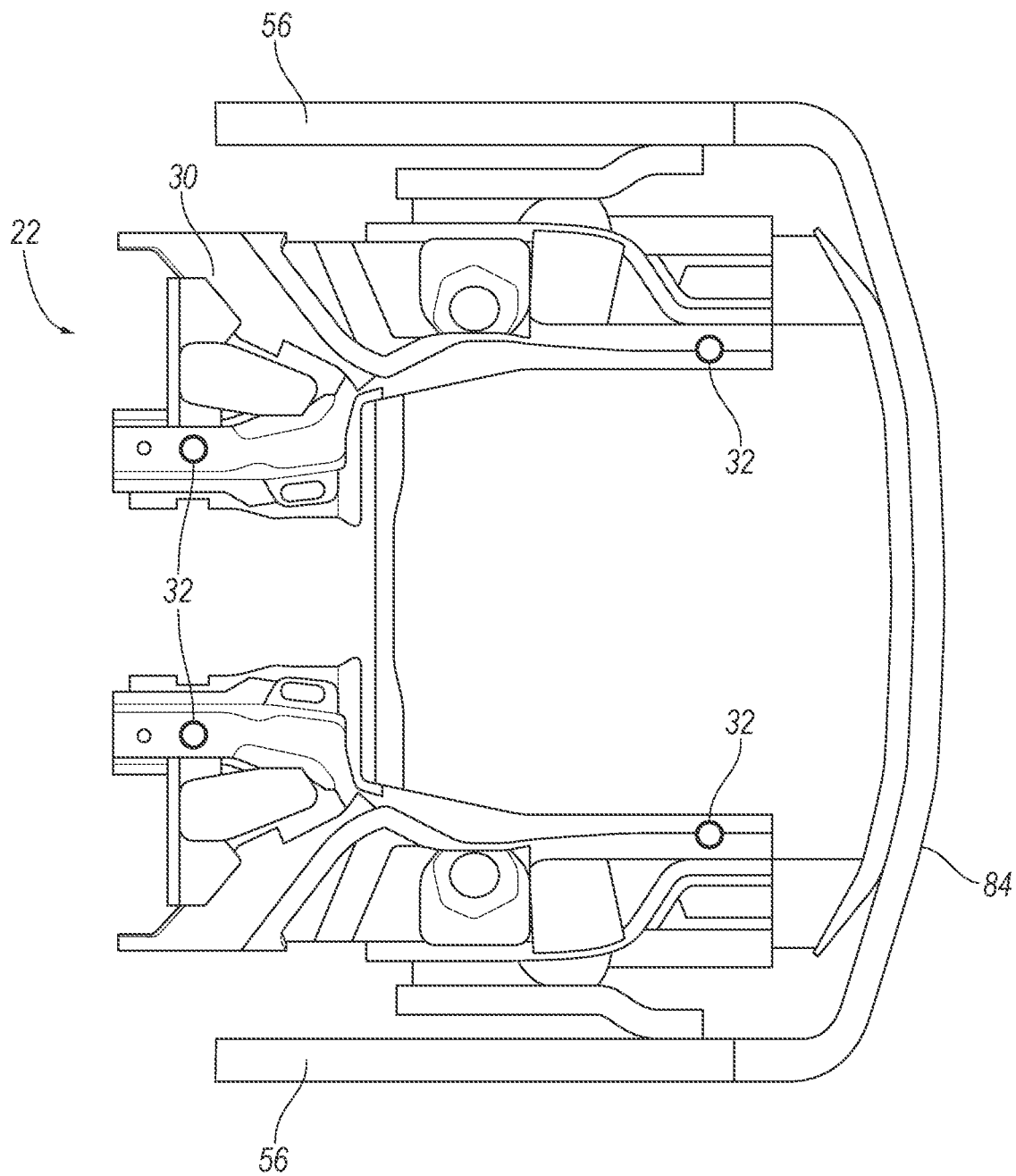
FIG. 4 is a bottom view of a portion of the vehicle.
Figure 5:
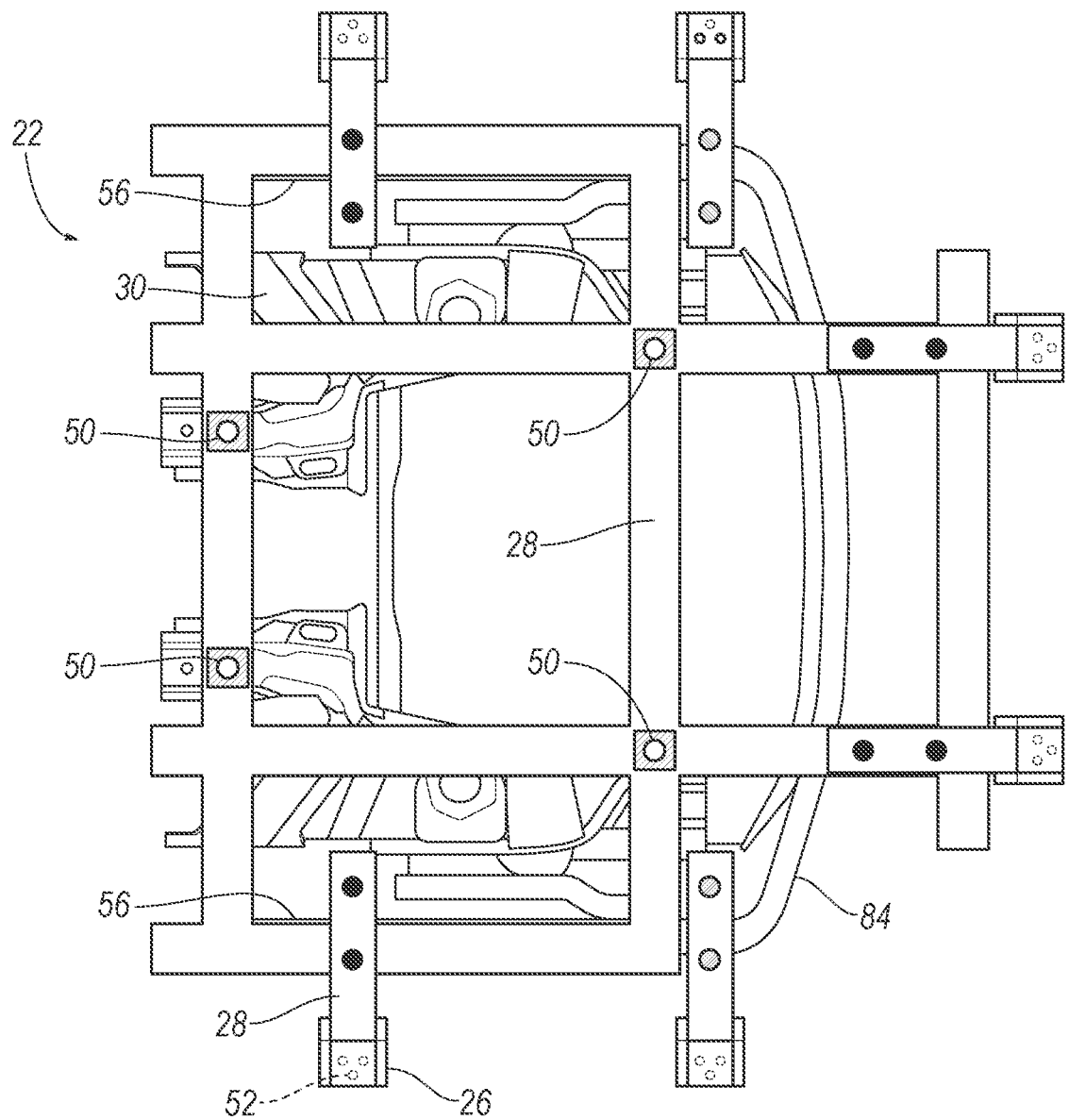
FIG. 5 is a bottom view of the portion of the vehicle with a jig attached thereto.
Figure 6:
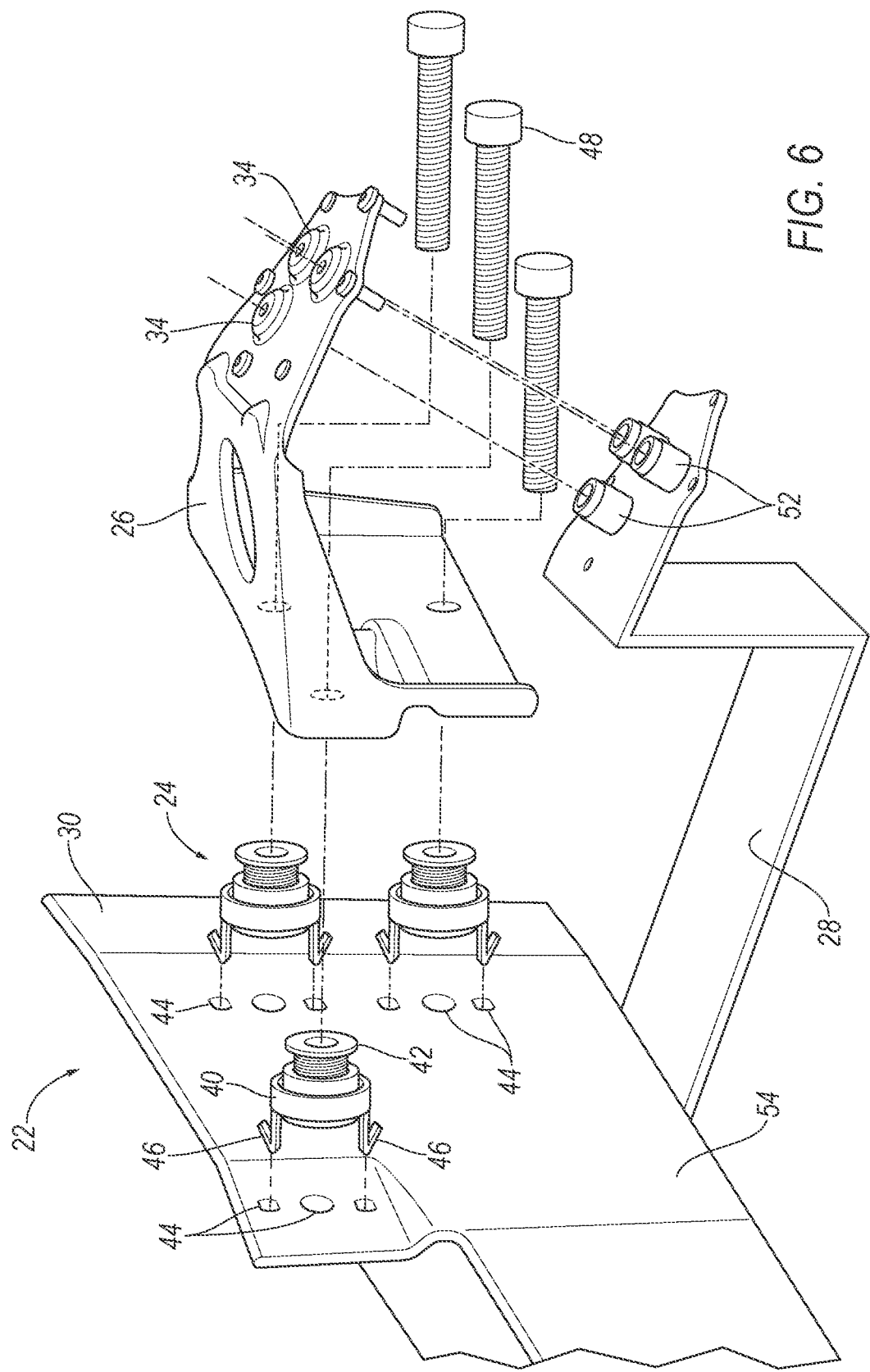
FIG. 6 is an exploded view of a portion of the vehicle, the sensor bracket, and the jig.

A method for installing sensors to a vehicle includes fixing a plurality of tolerance compensators to the vehicle. The method includes fixing a plurality of sensor brackets to a jig. The method includes fixing the jig to a vehicle. The method includes, after fixing the sensor brackets to the jig and the jig to the vehicle, fixing the sensor brackets to the vehicle by connecting the tolerance compensators to the sensor brackets and adjusting dimensions of the tolerance compensators to maintain positions of the sensor brackets relative to the vehicle and each other, the positions defined by the jig.

The method may include, after fixing the sensor brackets to the vehicle, removing the jig from the sensors and the vehicle.

The method may include, after fixing the sensor brackets to the vehicle, fixing sensors to the sensor brackets.

The fixing the jig to the vehicle may include aligning a first plurality of datums of the jig with a second plurality of datums of the vehicle.

The first plurality of datums may include pins.

The second plurality of datums may include underbody master locators of the vehicle.

The tolerance compensators may be fixed at pre-drilled holes in a body of the vehicle.

The tolerance compensators may include first ends fixable to the vehicle and second ends fixable to the sensor brackets, and wherein adjusting dimensions of the tolerance compensators includes adjusting lengths of the tolerance compensators between the first ends and the second ends.

The jig may be fixed to the vehicle before the sensor brackets are fixed to the jig.

The sensor brackets may be fixed at a front, a right side, and a left side of the vehicle.

The sensor brackets may include a plurality of datums that define positions of the sensors relative to the vehicle and each other.

The sensors may be engaged with the datums and fixed to the sensor brackets after the dimensions of the tolerance compensators are adjusted.

With reference to the Figures, wherein like numerals indicate like parts throughout the several views, a method for installing sensors 20 to a vehicle 22 is shown. The method includes fixing a plurality of tolerance compensators 24 to the vehicle 22, fixing a plurality of sensor brackets 26 to a jig 28, and fixing the jig 28 to the vehicle 22. After fixing the sensor brackets 26 to the jig 28 and the jig 28 to the vehicle 22, the method further includes fixing the sensor brackets 26 to the vehicle 22 by connecting the tolerance compensators 24 to the sensor brackets 26 and adjusting dimensions of the tolerance compensators 24 to maintain positions of the sensor brackets 26 relative to the vehicle 22 and each other, the positions of the sensor brackets 26 defined by the jig 28. The method enables sensors 20 attached to the sensor brackets 26 to have specific positions relative to each other and the vehicle 22, e.g., without requiring iterative measurement and adjustment of the positions of the sensor brackets 26 via disassembly and reassembly to add or remove spacing washers, etc.

With reference to FIG. 1, the vehicle 22 may be any suitable type of ground vehicle, e.g., a passenger or commercial automobile such as a sedan, a coupe, a truck, a sport utility, a crossover, a van, a minivan, a taxi, a bus, etc.

The vehicle 22 includes a vehicle frame and body 30. The vehicle frame and body 30 may be of a unibody construction in which the frame is unitary with the vehicle body 30 including frame rails, pillars, roof rails, etc. As another example, the frame and body 30 may have a body-on-frame construction also referred to as a cab-on-frame construction in which the body 30 and frame are separate components, i.e., are modular, and the body 30 is supported on and affixed to the frame. Alternatively, the frame and body 30 may have any suitable construction. The frame and body 30 may be of any suitable material, for example, steel, aluminum, and/or fiber-reinforced plastic, etc. The vehicle body 30 includes one or more datums 32. As used herein, datums 32 are structures used to position and/or orient components relative to each other via engagement of the datums 32 with another structure. The datums 32 may include, for example, one or more holes, edges, depressions, protrusions, posts, pins, tracks, etc., of the body 30. For example, the datums 32 of the body 30 may include underbody master locators of the vehicle 22, i.e., holes on an underside of the vehicle 22 used as primary datums to assemble the body 30 and components attached thereto.

The vehicle 22 can include a system or systems for autonomously or semi-autonomously operating the vehicle 22, e.g., an advanced driver assist system ADAS for speed control, lane-keeping, etc. The system or systems for autonomously or semi-autonomously operating the vehicle 22 includes a variety of sensors 20. The sensors 20 may include a variety of devices such as are known to provide data about a physical object to a computer of the vehicle 22. In the context of this disclosure, an object is a physical, i.e., material, item that can be represented by physical phenomena e.g., light or other electromagnetic waves, or sound, etc. detectable by vehicle sensors 20. Thus, vehicles, as well as other items including as discussed below, fall within the definition of object herein. For example, the sensors 20 may include Light Detection And Ranging LIDAR vehicle sensors 20, etc., that provide relative locations, sizes, and shapes of objects surrounding the vehicle 22. As another example, one or more radar vehicle sensors 20 may provide data to provide locations of the objects, second vehicles, etc., relative to the location of the vehicle 22. The vehicle sensors 20 may further alternatively or additionally, for example, include camera vehicle sensors 20, e.g., front view, side view, etc., providing images from an area surrounding the vehicle 22.

Each of the sensors 20 defines a field-of-view. The field-of-view is a volume from which light, or other detectable medium such a sound or electromagnetic wave, is detectable by the respective sensor 20. For example, the field-of-view of a camera or LIDAR may be bounded between upper and lower vertical limits and between left and right lateral limits relative a facing direction of the respective sensor 20. When the sensors 20 are properly positioned, oriented, and fixed relative to each other and the vehicle 22, e.g., using the jig 28 and the tolerance compensators 24, the fields-of-view of the sensors 20 may collectively define an overall volume that encompasses an entity of a desired volume relative to the vehicle 22. The desired volume relative to the vehicle 22 may surround the vehicle 22 and be within a threshold distance of the vehicle 22, e.g., without blind spots or misalignments that may be disadvantageous to autonomously or semi-autonomously operating the vehicle 22. For example, two sensors 20 may be at a center of a front facia 54 of the vehicle 22 and face vehicle-forward, two sensors 20 may be at sides of the front facia 54 of the vehicle 22 and face vehicle-forward and laterally outward, and two sensors 20 may be at right and left side fenders 56 of the vehicle 22 and face laterally outward.

Turning to FIGS. 2-6, the sensor brackets 26 fix the sensors 20 to the vehicle body 30, e.g., in specific positions and orientations relative to each other and the vehicle 22 to collect data from the desired volume relative to the vehicle 22. The sensor brackets 26 include a plurality of datums 34, e.g., holes, edges, posts, etc., to align and connect the respective sensor bracket 26 to the tolerance compensators 24, the respective sensor 20, and/or the jig 28. The datums 34 define positions of the sensors 20 relative to the vehicle 22 and each other, i.e., when the sensors 20 are engaged with the datums 34 and fixed to the sensor brackets 26 attached to the vehicle 22 with the jig 28. The datums 34 of each sensor bracket 26 are in specific positions and orientations relative to each other. The datums 34 may be multipurpose, for example, certain holes of the sensor bracket 26 may engage the jig 28 while the bracket is attached to the tolerance compensators 24, and, after the jig 28 is removed, the same holes may fix one of the sensors 20 to the sensor bracket 26 via fasteners engaged with such holes.

The tolerance compensators 24 connect the sensor brackets 26 to the body 30 of the vehicle 22. The tolerance compensators 24 may provide specific positions and orientations defined by the jig 28 to the sensor brackets 26 when attached to the body 30, e.g., to compensate for stack up and other tolerance variances of the body 30 that may arise from manufacturing and assembling processes. In other words, the jig 28 may maintain the sensor brackets 26 at specific defined positions relative to each other, that the tolerance compensators 24 may be adjustable to fixed the sensor brackets 26 at such positions, e.g., after removing the jig 28. The tolerance compensators 24 are adjustable to vary a dimension, such as a length, of the respective tolerance compensator 24. For example, adjusting dimensions of the tolerance compensators 24 may include adjusting lengths of the tolerance compensators 24 between first ends 36 and second ends 38 of the respective tolerance compensator 24. The first end 36 ends of the tolerance compensators 24 may be fixable to the body 30 the vehicle 22. The second ends 38 may be fixable to the sensor brackets 26. For example, the tolerance compensator 24 may include a base 40 and an adjustable member 42. The base 40 may include the first end 36 and be immovability fixed to the body 30, e.g., to a pre-drilled hole 44 or other structure via clip 46, rivet, interference fit, weld, etc. The adjustable member 42 may include the second end 38 and may be movable relative to the body 30 and the base 40. For example, the adjustable member 42 may threadedly engage the base 40. Rotation of the adjustable member 42 in one direction relative to the base 40 may move the second end 38 toward the first end 36, decreasing the length of the tolerance compensators 24. Rotation of the adjustable member 42 in an opposite direction relative to the base 40 may move the second end 38 away from the first end 36, increase the length of the tolerance compensators 24. A fastener 48 may engage the hole of the sensor bracket 26. The fastener 48 may threadedly engage the base 40 or the adjustable member 42 and fix the sensor bracket 26 to the second end 38.

The jig 28 enables multiple sensor brackets 26 to be fixed to the body 30 at specific predetermined positions relative to each other and the body 30 defined by the jig. The sensors 20 at the defined positions may collect data from the desired volume relative to the vehicle 22. For example, the jig 28 may define forward facing positions for the two sensors 20 at the center of the front facia 54 of the vehicle 22, a right-forward facing position and a left-forward facing position for the two sensors 20 at the sides of the front facia 54 of the vehicle 22, and a right facing position and a left facing position for the two sensors 20 at the side fenders 56 of the vehicle 22.

The jig 28 includes one or more datums 50 engageable with the datums 32 of the body 30. The datums 32 may define the defined positions of the jig 28. For example, the jig 28 may include posts engageable with the master body locators. Engagement of the posts with, e.g., by being disposed within holes of, the master body locators positions and orients the jig 28 relative to the body 30. The jig 28 may include datums 52 that may engage the datums 34 of one of the sensor brackets 26 at each of the defined positions. For example, the datums 52 of the jig 28 may include pins that may be disposed within the holes of the sensor bracket 26 when the sensor bracket 26 is at the defined position. The pins may be retractable, e.g., to facilitate separation of the sensor bracket 26 and the jig 28.

Figure 7:
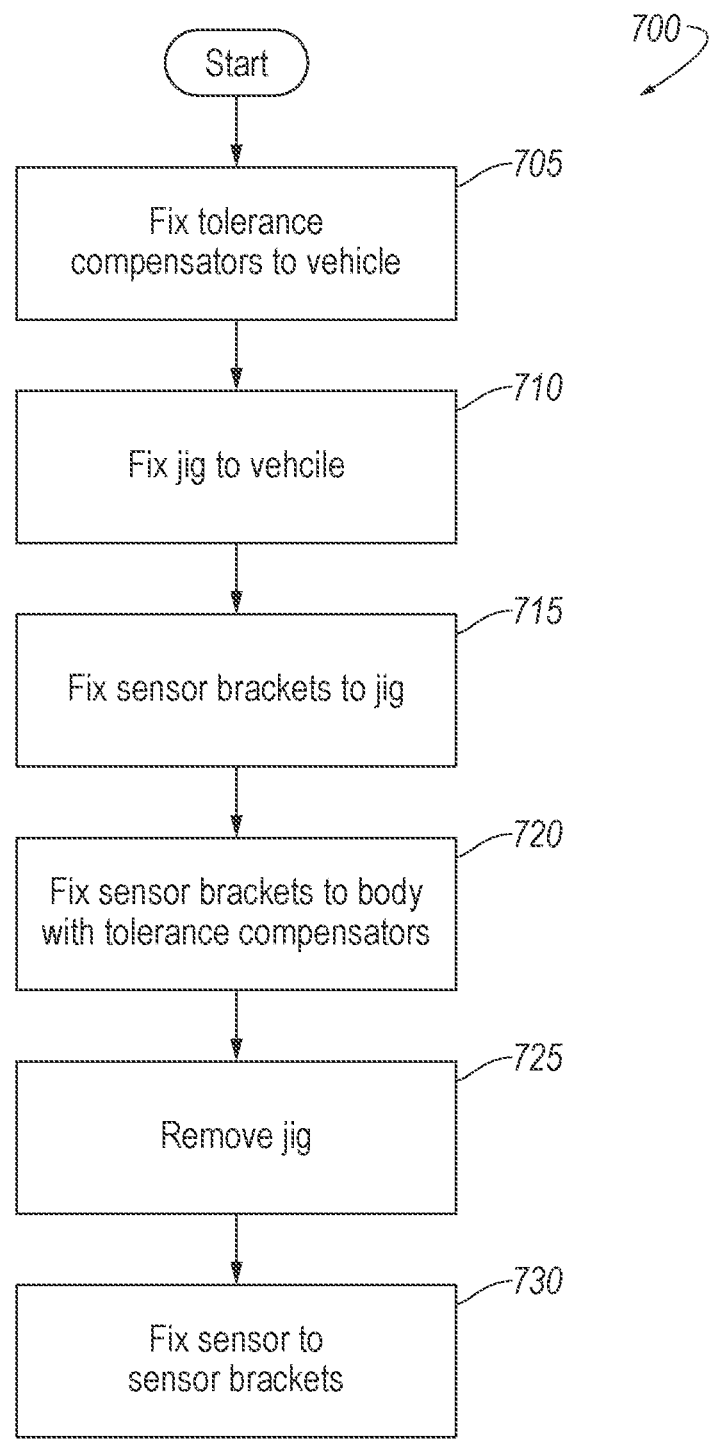
FIG. 7 is a flowchart showing method steps of attaching the sensors to the vehicle with the jig.

With reference to FIG. 7, an exemplary flow chart 700 illustrating the method for installing the sensors 20 to the vehicle 22 is shown.

The method 700 may begin at a step 710 that includes fixing a plurality of tolerance compensators 24 to the vehicle 22. The bases 40 of the tolerance compensators 24 may be clipped, or otherwise fixed, to the body 30, e.g., at the pre-drilled holes 44, of the body 30 of the vehicle 22. Once fixed, the first end 36 of the base 40 may abut the body 30. The tolerance compensators 24 may be fixed to the body 30, for example, at the center and sides of the front facia 54, at the right and left fenders 56, etc. The tolerance compensators 24 may initially by configured to have the shortest possible distances between the first ends 36 and the second ends 38.

At a step 720 of the method 700, the jig 28 is fixed to the body 30 of the vehicle 22. Fixing the jig 28 to the body 30 may include aligning a plurality of datums 50 of the jig 28 with a plurality of datums 32 of the vehicle 22. For example, pins of the jig 28 may be inserted into the underbody master locators. Additional structures may be used to fix the jig 28 to the body 30, e.g., clamps, fasteners, etc. The jig 28 may be fixed to the vehicle 22 before a step 730 of the method.

At the step 730 of the method 700, a plurality of the sensor brackets 26 are fixed to the jig 28 at specific defined predetermined positions relative to each other and the body 30. Fixing the sensor brackets 26 to the jig 28 may include engaging datums 34 of the sensor bracket 26 with datums 52 of the jig 28. For example, pins of the jig 28 may be disposed within holes of the sensor brackets 26. Additional structures may be used to fix the sensor brackets 26 to the jig 28, e.g., clamps, fasteners, etc. The sensor brackets 26 may be fixed to the jig 28 at a front, a right side, and a left side of the vehicle 22, e.g., at the center and sides of the front facia 54 and at the right and left fenders 56.

At a step 740 of the method 700, after fixing the sensor brackets 26 to the jig 28 and the jig 28 to the vehicle 22, the sensor brackets 26 are fixed to the body 30 of the vehicle 22 by connecting the tolerance compensators 24 to the sensor brackets 26 and adjusting dimensions of the tolerance compensators 24 to maintain the positions defined by the jig 28 of the sensor brackets 26 relative to the vehicle 22 and each other. Adjusting dimensions of the tolerance compensators 24 may include adjusting lengths of the tolerance compensators 24 between the first ends 36 and the second ends 38. For example, the adjustable member 42 may be rotated relative to the base 40 to increase the length between the first end 36 and the second end 38 until the second end 38 abuts the sensor bracket 26 at the respective datum 34. After the second end 38 abuts the sensor bracket 26, the fastener 48 may be used to fix the sensor bracket 26 to the second end 38.

At a step 750 of the method 700, after fixing the sensor brackets 26 to the body 30 of the vehicle 22, the jig 28 is removed from the sensor brackets 26 and the body 30 of the vehicle 22. For example, pins or other datums of the jig 28 may be disengaged or otherwise removed from holes or other datums of the body 30 and sensor brackets 26. Other structure, e.g., clamps, fasteners, etc., fixing the jig 28 to the body 30 and the sensor brackets 26 may also be removed.

At a step 760 of the method 700, after the dimensions of the tolerance compensators 24 are adjusted and after fixing the sensor brackets 26 to the vehicle 22, a plurality of sensors 20 are fixed to the sensor brackets 26. Fixing the sensors 20 to the sensor brackets 26 may include engaging the sensor 20 with the datums 34 of the sensor brackets 26. For example, holes of sensor 20 and holes of the sensor bracket 26 may be aligned, and a fastener disposed therein. As another example, depressions of the sensor bracket 26 may be engaged with protrusions of the sensor 20. As another example, one or more specified surfaces of the sensors 20 may be placed into abutment with one or more specified surfaces of the sensor brackets 26. Other structure, e.g., clamps, fasteners, etc., may be used to fix the sensors 20 to the sensor brackets 26. The sensors 20 attached to the sensor brackets 26 at the step 760 may be in positions and orientations relative to each other and the body 30 to capture data from the desired volume, e.g., without needing to realign the sensors 20 and/or brackets 26 by iteratively measuring positions of the sensors 20, disassembling the sensors 20 from the brackets 26 and reassembling the sensors 20 to the brackets 26 with added or removed spacers to position the sensors 20.

With regard to the processes, systems, methods, etc. described herein, it should be understood that, although the steps of have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain examples.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method for installing sensors to a vehicle, the method comprising:
   fixing a plurality of tolerance compensators to the vehicle;
   fixing a plurality of sensor brackets to a jig;
   fixing the jig to a vehicle; and
   after fixing the sensor brackets to the jig and the jig to the vehicle, fixing the sensor brackets to the vehicle by connecting the tolerance compensators to the sensor brackets and adjusting dimensions of the tolerance compensators to maintain positions of the sensor brackets relative to the vehicle and each other, the positions defined by the jig.

2. The method of claim 1, further comprising, after fixing the sensor brackets to the vehicle, removing the jig from the sensors and the vehicle.

3. The method of claim 1, further comprising, after fixing the sensor brackets to the vehicle, fixing sensors to the sensor brackets.

4. The method of claim 3, wherein fixing the jig to the vehicle includes aligning a first plurality of datums of the jig with a second plurality of datums of the vehicle.

5. The method of claim 4, wherein the first plurality of datums includes pins.

6. The method of claim 5, wherein the second plurality of datums includes underbody master locators of the vehicle.

7. The method of claim 3, wherein the tolerance compensators are fixed at holes in a body of the vehicle.

8. The method of claim 3, wherein the tolerance compensators include first ends fixable to the vehicle and second ends fixable to the sensor brackets, and wherein adjusting dimensions of the tolerance compensators includes adjusting lengths of the tolerance compensators between the first ends and the second ends.

9. The method of claim 1, wherein the jig is fixed to the vehicle before the sensor brackets are fixed to the jig.

10. The method of claim 1, wherein the sensor brackets are fixed at a front, a right side, and a left side of the vehicle.

11. The method of claim 1, wherein the sensor brackets include a plurality of datums that define positions of the sensors relative to the vehicle and each other.

12. The method of claim 11, wherein the sensors are engaged with the datums and fixed to the sensor brackets after the dimensions of the tolerance compensators are adjusted.

* * * * *